US009064355B2

(12) United States Patent
Candido

(10) Patent No.: US 9,064,355 B2
(45) Date of Patent: Jun. 23, 2015

(54) METHOD AND SYSTEM FOR CONTROLLING AND MONITORING A POINT OF SALE

(75) Inventor: Sergio Candido, Milan (IT)

(73) Assignee: FENICIA S.P.A., Milan (IT)

( * ) Notice: Subject to any disclaimer, the term of this patent is extended or adjusted under 35 U.S.C. 154(b) by 369 days.

(21) Appl. No.: 13/379,402

(22) PCT Filed: Apr. 27, 2010

(86) PCT No.: PCT/EP2010/055602

§ 371 (c)(1),
(2), (4) Date: Feb. 15, 2012

(87) PCT Pub. No.: WO2011/003638

PCT Pub. Date: Jan. 13, 2011

(65) Prior Publication Data

US 2012/0133771 A1 May 31, 2012

(30) Foreign Application Priority Data

Jul. 7, 2009 (EP) .................................... 09425266

(51) Int. Cl.
*H04N 7/18* (2006.01)
*G07C 9/00* (2006.01)
(Continued)

(52) U.S. Cl.
CPC ........ *G07C 9/00158* (2013.01); *G07C 9/00166* (2013.01); *G07G 1/0036* (2013.01); *G07G 3/00* (2013.01)

(58) Field of Classification Search
CPC .. G07C 9/00158; G07C 9/00166; A61B 6/14; G01N 21/8901
USPC ......................................................... 348/150
See application file for complete search history.

(56) References Cited

U.S. PATENT DOCUMENTS 4,719,363 A * 1/1988 Gallacher ..................... 307/117
5,138,638 A * 8/1992 Frey ................................. 377/6
(Continued)

FOREIGN PATENT DOCUMENTS

EP 1821237 8/2007
EP 1821237 A1 * 8/2007 ............... G06K 9/00
(Continued)

OTHER PUBLICATIONS

International Search Report for PCT/EP2010/055602 mailed Jun. 22, 2010.

(Continued)

*Primary Examiner* — Gims Philippe
(74) *Attorney, Agent, or Firm* — Nixon & Vanderhye PC

(57) ABSTRACT

The present invention concerns a method and a system for controlling and monitoring a point of sale, said point of sale having an opening (A), said method and system controlling the potential customers that pass through said opening (A) of said point of sale. Particularly, the system comprises a passage sensor (2), adapted to be disposed in the proximity of said opening (A) for generating a passage signal (Sp) when a person (P) passes through said opening (A), imaging means (5) adapted to be disposed in the proximity of said opening (A) for acquiring an image (6) of at least one person (P) that passes through said opening (A) and connection and control means, for connecting said passage sensor (2) with said imaging means (5) so that, upon generation of said passage signal (Sp), said imaging means (5) acquire the image of said person (P) that is passing through said opening (A).

14 Claims, 3 Drawing Sheets

(51) Int. Cl.
*G07G 1/00* (2006.01)
*G07G 3/00* (2006.01)

(56) References Cited

U.S. PATENT DOCUMENTS

| | | | | |
|---|---|---|---|---|
| 7,652,687 | B2 * | 1/2010 | Sorensen | 348/150 |
| 2003/0034876 | A1 * | 2/2003 | Puchek et al. | 340/5.53 |
| 2012/0127316 | A1 * | 5/2012 | Kundu et al. | 348/150 |

FOREIGN PATENT DOCUMENTS

| | | | | |
|---|---|---|---|---|
| GB | 2342208 | | 4/2000 | |
| GB | 2342208 A | * | 4/2000 | G06F 17/60 |
| WO | WO 01/52545 | | 7/2001 | |

OTHER PUBLICATIONS

Written Opinion of the International Searching Authority mailed Jun. 22, 2010.

* cited by examiner

METHOD AND SYSTEM FOR CONTROLLING AND MONITORING A POINT OF SALE

This application is the U.S. national phase of International Application No. PCT/EP2010/055602 filed Apr. 27, 2010 which designated the U.S. and claims priority to EP 09425266.5 filed Jul. 7, 2009, the entire contents of each of which are hereby incorporated by reference.

The present invention relates to a system and a method for controlling and monitoring a point of sale, particularly but without limitation a method and system for remotely controlling and monitoring the visits by potential customers of the point of sale, as defined in the preambles of claims 1 and 12 respectively.

In any retail store or commercial premises, it may be advantageous to track the number of incoming and outgoing visitors that pass through the doors of that premises, providing useful information for later commercial consideration.

Commercial considerations include the risk of shoplifting, i.e. stealing of displayed goods or considerations concerning the rate of incoming visitors that actually bought an item displayed in the point of sale.

As the flow of visitors increases, these consideration become more complex.

One of the technical issues to be addressed to obtain commercially useful data from the number of incoming people (and possibly the outgoing people, although this is less significant) is the possibility of discriminating accesses of potential customers from accesses of people that come with them (such as relatives or friends).

Such people may have no interest in buying an item displayed in the point of sale but also pass through the entrance of the commercial space, for example to accompany the potential customer.

A second issue is the possibility of discriminating accesses based on real commercial interest, i.e. the need of buying an object or simply curiosity for the displayed items from accesses based on different reasons, such as supply (post services, maintenance, etc.), and incoming or outgoing personnel for lunch break.

A further technical problem related to counting of incoming and outgoing people is the possibility of dynamically determining the times of higher shoplifting risk, without necessarily relying on historical data, such as the time of year or geographic location.

Systems are known in the art for detecting people coming into the premises separately from people going out of it, which consist, for instance of passage sensors integrated in anti-shoplifting modules placed at the entrance/exit of the premises.

Nevertheless, none of the above issues can be either addressed or solved by these systems.

In view of the prior art as described above, the object of the present invention is to provide a system and a method that at least partially solve at least some of the above mentioned issues.

According to the present invention, this object is fulfilled by a method and a system for controlling and monitoring a point of sale, preferably from a remote location, by more accurate customer access counting.

The characteristics and advantages of the present invention will appear from the following detailed description of one practical embodiment, which is illustrated without limitation in the annexed drawings, in which.

Figure 1:
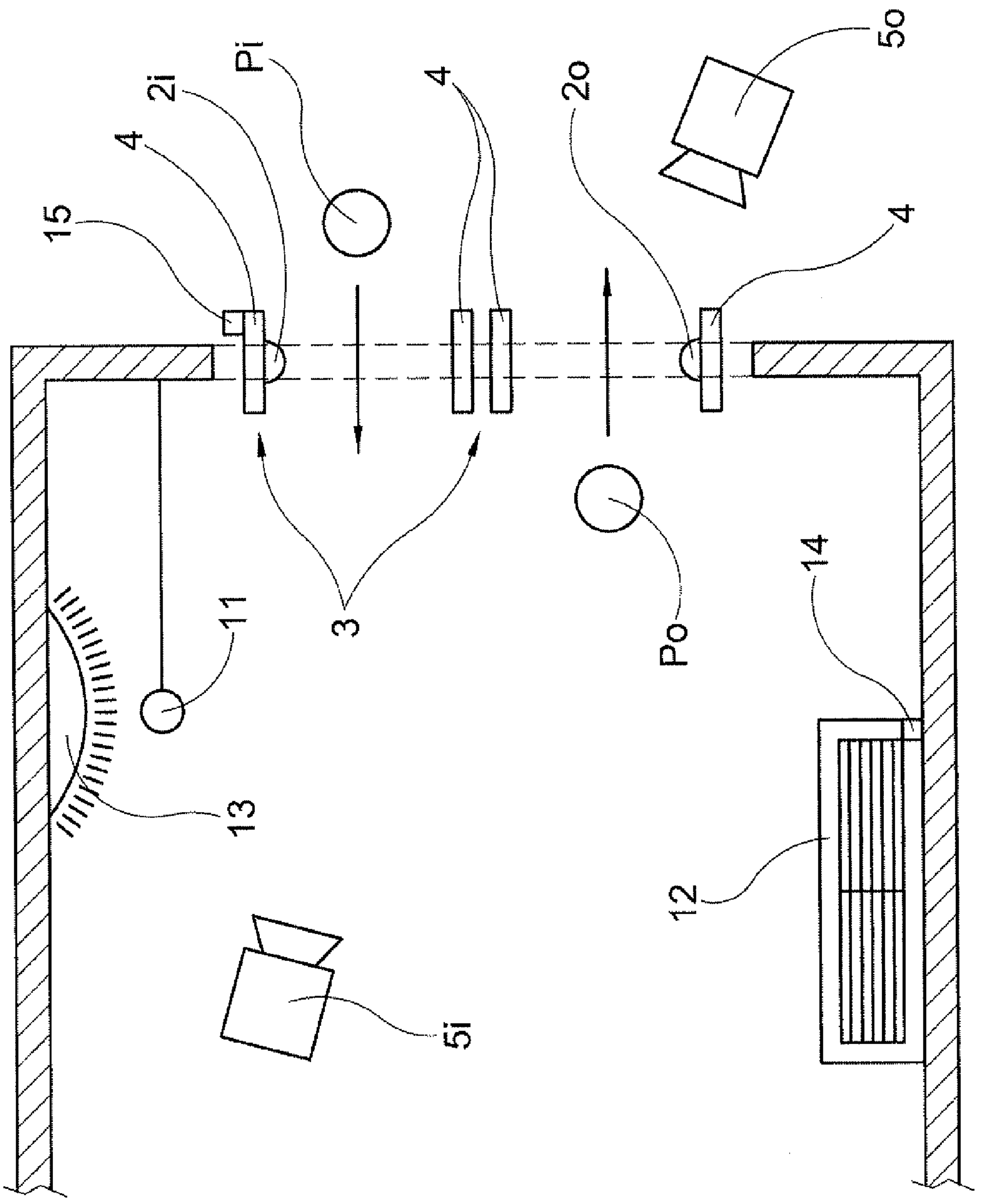
FIG. 1 is a schematic plan view of a possible embodiment of the present invention.
Figure 2:
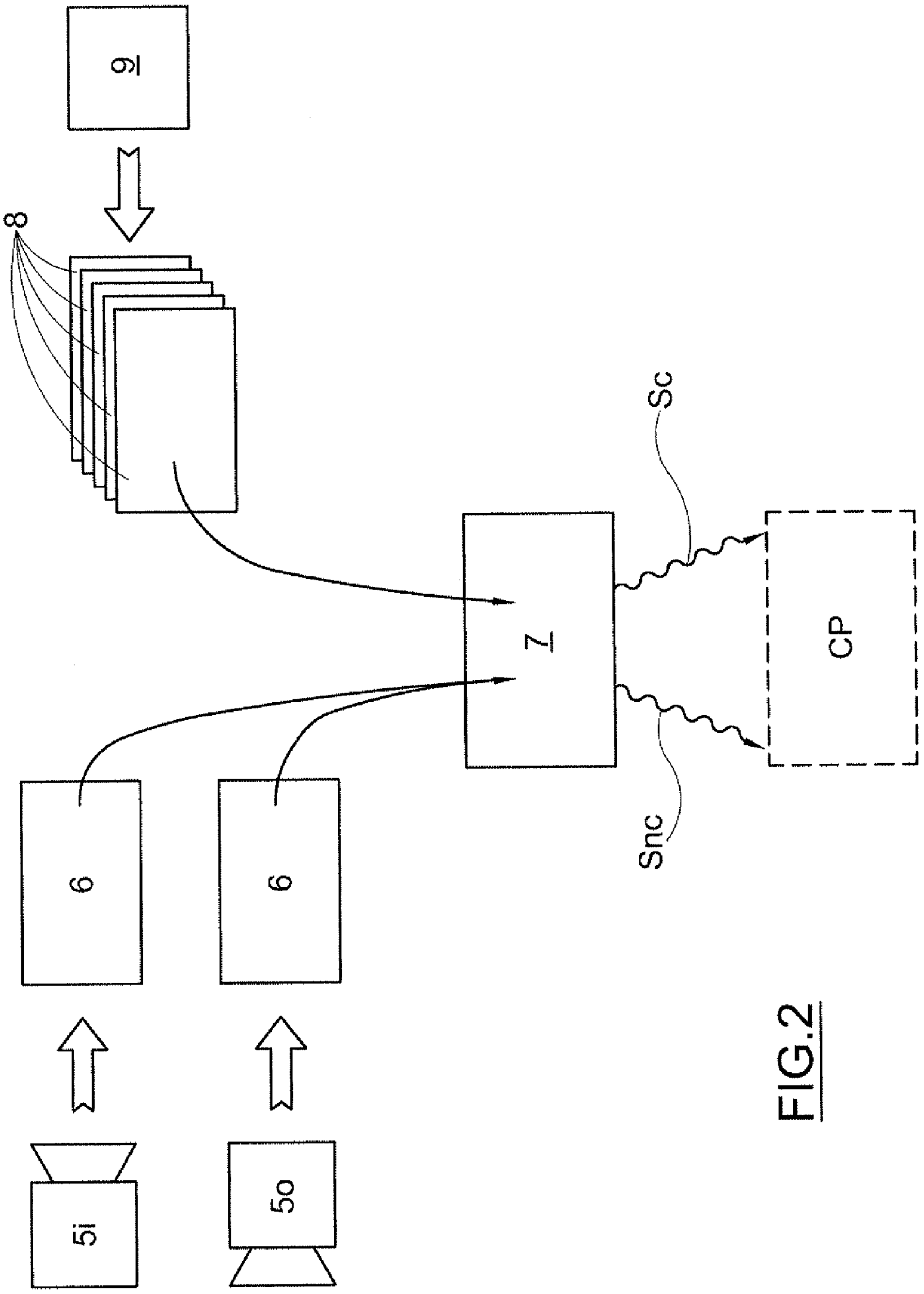
FIG. 2 is a principle view of the method and system for counting visitors in a point of sale according to the present invention.
Figure 3:
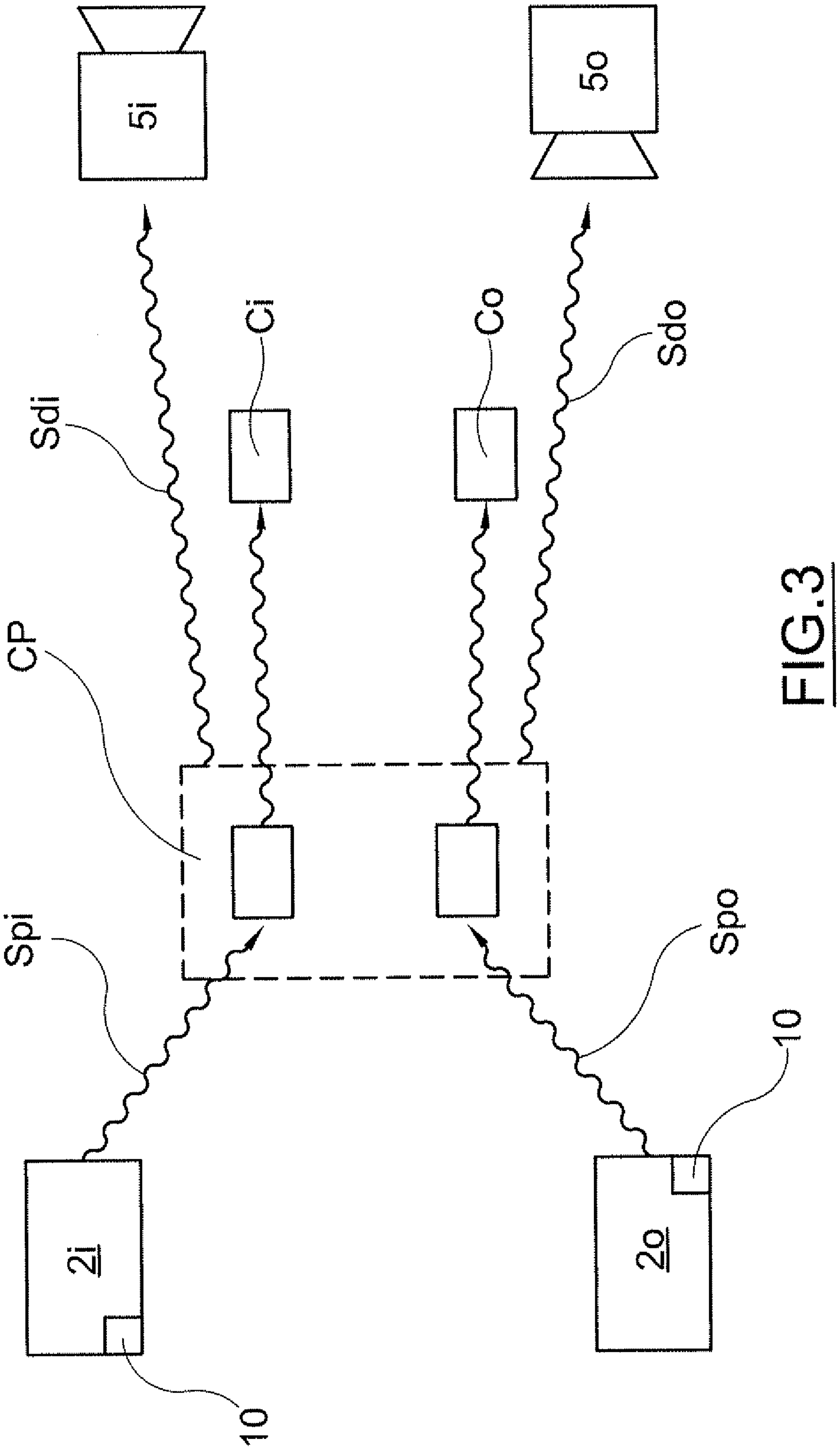
FIG. 3 is a further principle view of the method and system for counting visitors in a point of sale according to the present invention.

Referring to the annexed figures, in premises having at least one entrance and/or exit opening A for people, a premises control system is designated by numeral 1.

The system 1 comprises one or more passage sensors 2, e.g. disposed at the sides of the opening A, which can detect people Pi coming into the premises and possibly people Po going out of the same premises.

Particularly, the passage sensor/s are operably associated with a control and monitoring unit (not shown) which in turn is in signal communication with a processing center CP.

The passage sensor/s 2 may consist, for instance, of an infrared (IR) sensor, which is commercially known and will not be further described herein.

At least one of the passage sensors 2 comprises means for generating a passage signal Sp, in response to the passage of at least one person Pi, Po.

Such passage signal Sp is transmitted, possibly via an appropriate processing center CP, to a log that acts as a counter C.

Particularly, there will be a passage sensor 2*i* for incoming people, that can generate an incoming passage signal Spi to increment the value indicated by an incoming counter Ci.

Optionally, there will also be another passage sensor 2*o* for outgoing people, that can generate an outgoing passage signal Spi to increment the value indicated by an outgoing counter Co.

Alternatively or in addition to the above, the system may include a general counter C, which may be incremented by the incoming passage signal Spi and decremented by the outgoing passage signal Spo; here, the general counter C may also track the maximum value that has been reached in one or more periods of time, such as one or more hours, one or more days, one or more weeks, one or more months and/or multiples and/or combinations thereof.

Advantageously, if the opening A is equipped with anti-shoplifting detectors 3, these passage sensors 2 may be mounted with or integrated in the modules 4 of the anti-shoplifting detectors 3.

As used herein, the term "anti-shoplifting detectors" is intended to indicate elements that can detect the passage of a special security tag, from within special modules 4.

These modules 4 are typically disposed at the opening A of the premises, so that a person Po that goes out of the premises must forcibly pass between two separate modules 4.

These modules 4 can detect particular tags and generate a signal, normally an alarm, when one of these tags passes between two modules 4. It shall be understood by the skilled person that the term "anti-shoplifting detectors" is only intended to define such a system.

According to a preferred embodiment of the present invention, the system 1 further comprises imaging means 5, advantageously located in appropriate positions to capture images of incoming Pi and/or outgoing Po people that pass through the opening A of the premises.

The imaging means 5 may advantageously include a camera, a camcorder or devices equivalent thereto.

In such preferred embodiment, the imaging means 5 may be triggered by a special trigger signal Sa.

The trigger signal Sa may be generated upon generation of the incoming passage signal Spi and/or the outgoing passage signal Spo.

In a preferred embodiment, the trigger signal Sa is generated upon generation of the incoming passage signal Spi.

Preferably, the imaging means 5 include incoming imaging means 5*i*and/or outgoing imaging means 5*o*, which are designed to be triggered by an incoming trigger signal Sai or an outgoing trigger signal Sao respectively.

In certain particular cases, the incoming trigger signal Sai may coincide with the incoming passage signal Spi and/or the outgoing trigger signal Sao may coincide with the outgoing passage signal Spo.

According to an advantageous embodiment, the processing center CP receives the incoming passage signals Spi and/or the outgoing passage signals Spo and consequently generates respective incoming and/or outgoing trigger signals Sai, Sao.

The imaging means 5 may thus capture an image 6 of an incoming and/or outgoing person or people Pi, Po and transmit it to the processing center CP.

For this purpose, the counter C comprises a relay that is utilized to transmit a pulse to the imaging means 5 and hence trigger preferably chronological recording of the acquired images 6.

Particularly, the imaging means 5 are in signal communication with the processing center CP.

It shall be noted that the control and monitoring unit has digital output lines through which the counter C or the means 5 may be, for instance, restarted or reset, if they have an external reset feature.

In one aspect of this embodiment, the processing center CP has a storage device for storing the image 6.

Such storage device may be a film or, more advantageously, a digital medium or equivalent devices.

The processing center CP of the system 1 includes comparison means 7 for comparing the image 6 acquired by the imaging means 5 with one or more images 8 from a data source 9.

The data source 9 may be, for instance, a computer system that can provide one or more images 8 and/or text, possibly filtered using preset parameters.

Advantageously, the comparison means 7 appropriately process the images 8 and/or the image 6, e.g. by changing colors and/or contrast and/or brightness and/or resolution.

Likewise, the comparison means 7 may also process one or more of these images 6, 8 so that they only substantially contain the face of one person. The comparison means 7 can also perform character recognition on any text accompanying the images 6 and compare it with the text stored in the data source 9.

For example, one image 6 acquired by the means 5 represents a supplier wearing clothes (cap, uniform, etc.) with trademarks and/or text (DHL, TNT-traco, etc.), that will be recognizable by the comparison means 7.

Therefore, the comparison means 7 compare the image 6 and/or any text content thereof with the images 8 and/or text of the data source 8 to determine whether the image 6 and/or any text content associated therewith matches at least one of the images 8 or not.

To obtain such result, the image 6 and/or any text content thereof is compared with each of the images 8 one by one or with multiple images at the same time in a sequence, until one of the images 8 corresponds to the image 6 or until all the images 8 have been unsuccessfully compared with the image 6.

The "matching" concept may be appropriately defined for purposes that will be more apparent below.

Alternatively, the comparison means 7 may include one or more persons, possibly using particular devices (such as a display screen), to display and compare the image 6 with the images 8; preferably, the comparison means 7 may be of automatic type, such as automatic face recognition and/or OCR or equivalent software.

The comparison means 7 may generate a match signal Sc if one of the images 7 matches the image 6, or a no-match signal Snc, if all the images 8 have been unsuccessfully compared with the image 6.

The no-match signal Snc may be used to stop processing and transmit a control to the processing center CP.

The match signal Sc, indicating that the face and/or any text contained in the image of one of the incoming or outgoing persons Pi, Po matches one of the faces contained in the images 8 provided by the data source 9 may be transmitted, either directly or via the processing center CP, to the respective incoming or outgoing counter Ci, Co, to prevent the value of such counter Ci, Co from being incremented.

In other words, the incoming or outgoing passage signal Spi, Spo may trigger a process flow in which the image of the face of the incoming or outgoing person Pi, Po is compared with a set of images 8 provided by a data source 9.

The images 8 may be, for instance, images of faces of people that can pass through the opening A but are known to the manager of the premises as non-potential customers.

These people are not expected to buy anything, and hence their passage through the opening A is not relevant for the purposes of any commercial consideration.

Therefore, with at least some of the embodiments of present invention the signal generated by a passage sensor 2 may be filtered, for the counters C, Ci, Co to only account for people Pi, Po that pass through the opening A as potential customers.

Advantageously, if the opening A is divided into multiple individual openings A1, A2, . . . Ai, there may be a counting system 1 as described above for each individual opening A1, A2 . . . Ai or a common counting system 1 shared by multiple individual openings A1, A2, . . . Ai, which are preferably in side-by-side relation, for the imaging means 5 to simultaneously detect the image of all the side-by-side openings that share the system 1.

Thus, the total number of incoming people indicated by the incoming people counter Ci may be filtered, to obtain an indicative number of potential customers only. Such new number may be used for commercial considerations, also for reporting purposes.

Particularly, by knowing the number of actual customers and the number and amount of the receipts that have been issued, the selling efficiency of the personnel in those premises may be assessed.

The system 1 further comprises corrective means 10 for correcting the count of potential customers, to exclude the potential customer accompanying people, or at least those that are likely to be customer accompanying people.

These corrective means 10 allow the system 1 to correct the count of incoming or outgoing counters Ci, Co, by preventing the count from including people that have passed through the opening A but are most likely to have passed through the opening A to accompany another person Pi, Po.

These corrective means 10 include a correcting device that prevents the counter C, Ci, Co from being incremented if the interval of time elapsed from the last increment is shorter than a minimum preset interval Tm.

This interval Tm may be, for instance, one second, a few seconds or a fraction of a minute, or an interval sufficient or substantially sufficient for the passage of a potential customer with all the people that accompany him/her.

The interval Tm shall not be necessarily selected to make sure that all the people accompanying the potential customer have actually passed through the opening A. It may be set, for instance, to make sure that this occurs in a statistically preset number of cases, such as at least 50%, at least 75% or at least 90% of the times, possibly based on historical data. Otherwise, the interval Tm may be freely set.

The system 1 may either allow or prevent adjustment of the interval Tm once it has been set the first time.

For instance, the corrective means 10 may prevent the incoming trigger signal Sai and/or the outgoing trigger signal Sao from being generated throughout the interval of time Tm.

In a preferred embodiment, the corrective means 10 are integrated in the passage sensor 2, which is programmed to wait an interval of time Tm between two successive scans.

Thus, if more than one person passes through the opening A during a detection step by the passage sensor 2, then the counter C, Ci, Co is increased by one unit, to account for the fact that multiple passages during a short interval of time are caused by one potential customer with people accompanying him/her.

Conveniently, the system 1 may also include one or more temperature sensors 11, which can generate a temperature signal St representative of the temperature that has been reached in the proximity of the sensor 11.

Such temperature signal St, which is processed as a function of a signal representative of a time of the day, may be useful to check for any abnormal operation in the premises.

For example, premises may include an air-conditioning system 12 and/or a plurality of spotlights or lighting devices 13. While the former consumes power to decrease temperature, the latter consume power to light the goods, thereby generating a local temperature increase, which contributes to global heating of the premises.

Obviously, each air-conditioning system 12 comprises one or more temperature sensors, but these are generally provided to optimize comfort for people in the premises only when the conditioning system 12 is on, such as during the premises opening time.

The control and monitoring unit in communication with the processing center CP advantageously has at least one analog input for monitoring the time-dependent signal detected by the temperature sensor 11 to control the temperature of the air-conditioning unit 12.

Such analog input of the control and monitoring unit may be used for all the devices that have an analog output signal, for instance varying from 0 to 5 V.

The air conditioning system 12 and/or the spotlights 13 may have their power absorption controlled by a power absorption device 14 which is operably connected, possibly by wireless means, to the control and monitoring unit.

Preferably, the connection between the power absorption device 14 and the control and monitoring unit is in the form of a RS485 serial bus.

Thus, the control and monitoring unit may receive the signals generated by the temperature sensor 11 and/or by the power absorption device 14. Then, these signals may be compared with historical data related to the time of the day and/or to the day of the year, to determine any significant deviations (i.e. exceeding a predetermined threshold Th).

This threshold Th may be, for instance, of a few degrees or a few watts, or may be determined as a function of the variance of the corresponding historical data.

The processing center CP may also generate an off signal to switch off one or more spotlights 13 or the air-conditioning system 12, if the deviation between the detected value and the historical values exceeds the threshold Th.

Such off signal may be generated, for example, if:

there is power absorption by the air-conditioning system 12 even outside the premises opening time and/or there is power absorption by the lighting devices 13 even outside the premises opening time.

Both situations might identify abnormal operating conditions in the premises, e.g. that the personnel have left one or more lighting devices 13 or the air-conditioning system 12 on during the night.

Besides causing a power waste, this increases risks of fire caused by a short-circuit or failure in one of the lighting devices 13 and the air-conditioning system 12.

If no personnel is available to promptly fix the failure, this may lead to possibly serious consequences.

This embodiment of the invention allows fast, reliable and cost-effective monitoring of such parameters, and improves safety in the premises.

For this purpose, a relay control is provided in the control and monitoring unit to switch the air-conditioning system 12 or spotlights 14 on and off, thereby directly energizing or de-energizing these devices.

It shall be further noted that the control and monitoring unit may be suitable for detecting whether there are units that are switched from an ON state to an OFF state.

For instance, if the premises entrance door unit and/or the dressing room door unit and/or the telephone unit are switched from an ON state (closed contact, closed entrance door or dressing room door, or hung up telephone) to an OFF state (open contact, open entrance door or dressing room door or lifted telephone).

For this purpose, the control and monitoring unit also has preferably optically insulated analog inputs, that can ensure discrete control of units, such as those with 0-5 V voltage variation.

It shall be further noted that the control system 1 can record the number of people passing outside the premises.

A motion sensor 15 is provided therefor, which is preferably of IR type and is mounted to the door:

The motion sensor 15 is operably connected with the control and monitoring unit that will retrieve information for submitting it to analysis by the processing center CP.

While reference has been made above to general premises, this disclosure advantageously applies to commercial premises, such as points of sale or retail stores.

Those skilled in the art will obviously appreciate that a number of changes and variants may be made to the arrangements as described hereinbefore to meet incidental and specific needs.

For instance, the passage sensor/s 2, the imaging sensor/s 5, the temperature sensor/s 11, the power absorption devices 14 and/or the processing center CP may be connected to the other components of the system 1 of the present invention by known local or remote arrangements, using wired or wireless connections.

For instance, the control and monitoring system 1 may be designed to be able to transmit the detected data through the Internet using secure protocols, such as HTTP or FTP, thereby uploading the images 6, and the temperature and power values that have been detected.

This advantageously affords real-time control and monitoring of the point/s of sale, and allows actions to be taken as soon as a problem arises, such as:

large number of potential customers and low reported turnover and/or receipts level;

abnormal power absorption at times other than the opening times of the premises;

failure to comply with corporate directives, requiring, for instance, the entrance door to be always open or air temperature inside the premises to be constantly set to about 25°.

The skilled person shall also understand that the preferred embodiments of the present invention may not be bound to the achievement of the above described technical effects, and that different effects may be also obtained, not necessarily described, for simplicity.

All of these changes and variants will fall within the scope of the invention, as defined in the following claims.

The invention claimed is:

1. A method for controlling and monitoring a point of sale, said point of sale having an opening (A), said method controlling the potential customers that pass through said opening (A) of said point of sale and comprising the steps of:

(a) providing a passage sensor (2*o*, 2*i*) that generates a passage signal (Sp, Spi, Spo) when at least one person (P, Pi, Po) passes through said opening (A), said passage sensor (2*o*, 2*i*) being disposed at the sides of said opening (A) so that said generated passage signal (Sp, Spi, Spo) is directed sideward toward the person (P) entering or leaving said opening (A)

(b) triggering imaging means (5) through said passage signal (Sp, Spi, Spo) to acquire the image (6) of said person (Pi, Po);

(c) comparing said image (6) of said person (P, Pi, Po) with one or more images (8) provided by a data source (9), in order to obtain the counting of said person (Pi, Po) automatically;

said comparing step further comprising a correcting step that prevents any further passages through said opening (A) from being counted, said correcting step preventing a counter (C, Ci, Co) from being incremented if the interval of the time elapsed from the last increment is shorter than a minimum predetermined interval, said correcting step using automatic recognition means in order to provide a value of said person (Pi, Po) that passes through the opening (A) as a potential customer.

2. The method as claimed in claim 1, wherein the step (c) further comprises the step of:

(c1) determining whether said image (6) of said person (P, Pi, Po) matches at least one of said one or more images (8) provided by said data source (9).

3. The method as claimed in claim 1, further comprising the step of:

(d) determining, based on the result of the comparison of step (c), whether a counter (C, Ci, Co) of people (P, Pi, Po) passing through said opening (A) has to be incremented.

4. The method as claimed in claim 3, wherein said counter (C, Ci, Co) is only increased if said image (6) of said person (P, Pi, Po) matches none of said one or more images (8) provided by said data source (9).

5. The method as claimed in claim 1, wherein, if said image (6) of said person (P, Pi, Po) matches at least of said one or more images (8) provided by said data source (9), then a match signal (Sc) is generated, which decrements said counter (C, Ci, Co) of people (P, Pi, Po) passing through said opening (A).

6. The method as claimed in any claim 1, wherein, if said image (6) of said person (P, Pi, Po) matches at least of said one or more images (8) provided by said data source (9), then a match signal (Sc) is generated, which prevents said passage signal (Spi, Spo) from incrementing said counter (C, Ci, Co).

7. The method as claimed in claim 1, wherein separate detection for incoming people (Pi) and outgoing people (Po) passing through said opening (A), and separate incoming (Ci) and outgoing (Co) counters are provided.

8. The method as claimed in claim 1, wherein said corrective means (10) are integrated in said passage sensor (2) so that, once that said passage sensor (2) has generated a passage signal (Sp, Spi, Spo), said passage sensor (2) has to wait said minimum predetermined interval (Tm) before generating a new passage signal (Sp, Spi, Spo).

9. The method as claimed in claim 1, wherein said minimum preset interval (Tm) is one second, a few seconds or a fraction of a minute.

10. A system (1) for controlling and monitoring a point of sale, said point of sale having an opening (A), said system being adapted to control the potential customers that pass through said opening (A) of said point of sale and comprising:

a passage sensor (2*o*, 2*i*) disposed in the proximity of said opening (A) for generating a passage signal (Sp) when a person (P) passes through said opening (A);

imaging means (5) disposed in the proximity of said opening (A) for acquiring an image (6) of at least one person (P) that passes through said opening (A);

connection and control means, for connecting said passage sensor (2*o*, 2*i*) with said imaging means (5) so that, upon generation of said passage signal (Sp), said imaging means (5) acquire the image of said person (P) that is passing through said opening (A);

a data source (9) for providing images (8);

comparison means (7) for comparing said image (6) acquired by said imaging means (5) with one or more images (8) from said data source (9);

corrective means (10) for preventing any further passages through said opening (A) from being counted;

said corrective means 10 preventing a counter (C, Ci, Co) from being incremented if the interval of the time elapsed from the last increment is shorter than a minimum predetermined interval; and wherein said passage sensor (2*o*, 2*i*) is disposed at the sides of the opening (A) so that the generated passage signal (Sp, Spi, Spo) is directed sideward toward the person (P) entering or leaving said opening (A).

11. The system (1) as claimed claim 10, wherein:

said comparison means (7) generate a match signal (Sc), if one of the images (8) matches said image (6) or a no-match signal (Snc), if none of the images (8) retrieved from said data source (9) matches said image (6); said counter (C, Ci, Co) being adapted to receive said match signal (Sc) and to provide the value of said people (Pi, Po) that pass through the opening (A) as potential customers.

12. The system (1) as claimed in claim 10, wherein at least part of the components of said system (1) is remotely located.

13. The system (1) as claimed in claim 10, wherein said minimum predetermined interval (Tm) is one second, a few seconds or a fraction of a minute.

14. The system (1) as claimed in claim 10, wherein said corrective means 10 prevent an incoming trigger signal (Sai) and/or an outgoing trigger signal (Sao) from being generated throughout the interval of time (Tm).

* * * * *